(12) United States Patent
Schpok et al.

(10) Patent No.: US 8,520,940 B1
(45) Date of Patent: Aug. 27, 2013

(54) AUTOMATIC CITY BLOCK SEGMENTATION IN AERIAL IMAGERY FOR PARALLEL PROCESSING

(75) Inventors: Joshua Schpok, Milpitas, CA (US); Jeremiah Childs, Berkeley, CA (US); Tilman Reinhardt, Woodside, CA (US)

(73) Assignee: Google Inc., Mountain View, CA (US)

( * ) Notice: Subject to any disclaimer, the term of this patent is extended or adjusted under 35 U.S.C. 154(b) by 113 days.

(21) Appl. No.: 13/103,585

(22) Filed: May 9, 2011

(51) Int. Cl.
*G06K 9/00* (2006.01)
(52) U.S. Cl.
USPC ........................................................ 382/164
(58) Field of Classification Search
USPC ......... 382/103, 164, 173, 285, 298; 345/419, 345/632, 664
See application file for complete search history.

(56) References Cited

U.S. PATENT DOCUMENTS 7,602,404 B1 * 10/2009 Reinhardt et al. ............ 345/629
8,115,761 B1 * 2/2012 Fan et al. ...................... 382/154

\* cited by examiner

*Primary Examiner* — Duy M Dang
(74) *Attorney, Agent, or Firm* — Sterne, Kessler, Goldstein & Fox P.L.L.C.

(57) ABSTRACT

A computer implemented system and method are disclosed for segmenting aerial and satellite imagery according to pre-defined regions contained in the images such as city blocks. An example system comprises a feature mask generation module, a partition generation module, one or more color map generation modules, a color map reassignment module, and a bounding box generation module. The system and method take aerial image data and vector map data as input and generate a composite color map for a geographic region of interest, wherein the color map comprises a plurality of pre-defined regions in which each pre-defined region can be defined by enclosing road segments. The disclosed system and method provide a convenient and logical way of segmenting large data sets of aerial imagery for use in other applications such as the construction of computer models of surface features of the Earth.

6 Claims, 7 Drawing Sheets
(4 of 7 Drawing Sheet(s) Filed in Color)

AUTOMATIC CITY BLOCK SEGMENTATION IN AERIAL IMAGERY FOR PARALLEL PROCESSING

BACKGROUND

1. Field

This disclosure relates to systems and methods for combining satellite and aerial imagery with map data wherein data is segmented according to predefined regions such that the data is suitably partitioned for parallel processing.

2. Background Art

The field of aerial imagery is concerned with capturing photographs of land masses over large areas. Aerial photographs are often combined. For example, a panoramic image can be made by stitching several photographs together. Large sets of aerial or satellite photographs can be combined and used in online map systems. Another area in which aerial imagery is used is in the field of Geographic Information Systems (GIS). A Geographic Information System or Geospatial Information System is any system that presents data specifically associated with spatial locations. An example of a GIS system is a system that correlates aerial or satellite images with maps.

One problem encountered in the field of aerial imagery is the need to break up enormous data sets for processing of images. There are many solutions to processing very large images, such as tiling schemes, hierarchal levels of detail, and encoding progressive resolutions. These methods are deficient because they break up or degrade the image structures. Traditional approaches are especially problematic when dealing with images of a city. Images of a city contain structure in the form of buildings, roads, bridges, etc. Problems arise when an image is broken up into segments called tiles, and structures span the tiles. For example, if a building or a bridge is split amongst two tiles, it can be a difficult problem to stitch the image back together.

Systems and methods are needed that suitably partition large image data sets for parallel processing.

BRIEF SUMMARY

A computer implemented system and method are disclosed for partitioning aerial and satellite imagery according to features contained in the images such as city blocks. Each segmented region is given an unique identifier. Assigning colors to segmented regions is a convenient way of providing unique identifiers although other alternatives are possible. In other embodiments, segmented regions can be identified by numbers.

An example system comprises a feature mask generation module, a partition generation module, one or more color map generation modules, a color map reassignment module, and a bounding box generation module.

The feature mask generation module is configured to use vector map data to generate a feature mask, comprising road segments, that is aligned with aerial image data corresponding to a geographic region of interest. The partition generation module is configured to partition aerial image data and the corresponding feature mask into tiles such that the data within a given tile is suitably partitioned for parallel processing. One or more color map generation modules are configured to generate a color map for each tile, wherein the color map comprises a plurality of pre-defined regions in which each pre-defined region can be defined by enclosing road segments. In a given color map, each pre-defined region is assigned a single uniform color. The color map reassignment module is configured to generate a composite color map for the entire geographic region of interest by comparing color maps of adjacent tiles and reassigning colors as needed so that pre-defined regions, split by tile boundaries, become uniformly colored contiguously across tile boundaries. In this way, tile boundaries are removed. The bounding box generator is configured to generate a segmentation of the aerial imagery for the entire geographic region of interest by computing and storing bounding boxes for the pre-defined regions in the composite color map after removing regions that are either too large or too small to be pre-defined regions.

Further features and advantages as well as the structure and operation of various embodiments are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The patent or application file contains at least one drawing executed in color. Copies of this patent or patent application publication with color drawings will be provided by the U.S. Patent and Trademark Office upon request and payment of the necessary fee.

The accompanying drawings which are incorporated herein and form a part of the specification, illustrate the present invention and together with the description, further serve to explain the principles of the invention and to enable a person skilled in the pertinent art(s) to make and use the invention.

DETAILED DESCRIPTION OF EMBODIMENTS

Reference in this specification to "one embodiment," "an embodiment," and "an example embodiment," etc., indicate that the embodiment described may include a particular feature, structure or characteristic but not every embodiment may necessarily include the particular feature, structure or characteristic. Moreover, such phrases are not necessarily referring to the same embodiment. Further, when a particular feature, structure or characteristic is described in connection with an embodiment, it is submitted that it is within the knowledge of one skilled in the art to effect such structure, feature, or characteristic in connection with other embodiments whether or not explicitly described. Embodiments will be described with reference to the accompanying figures.

This disclosure provides systems and methods for segmenting large data sets corresponding to aerial imagery according to pre-defined regions in the images such as city blocks. The systems and methods overcome problems that cannot be addressed by existing technology. In particular, systems and methods are provided which segment the data in such a way that physical features such as bridges, buildings, etc., are not split by the segmentation.

Figure 1A:
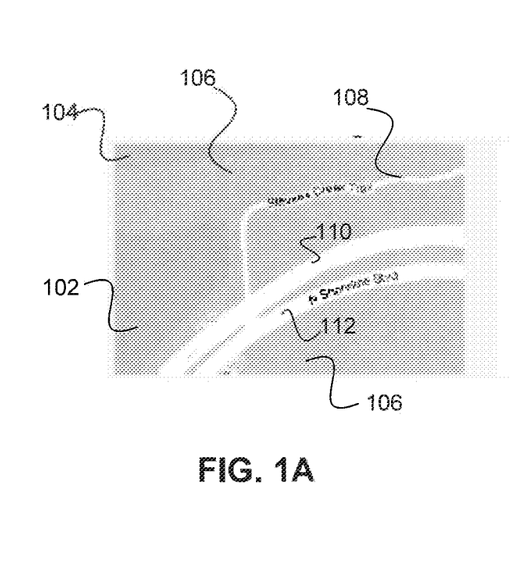
FIG. 1A shows a section of a map with water, land, and road features.
Figure 1B:
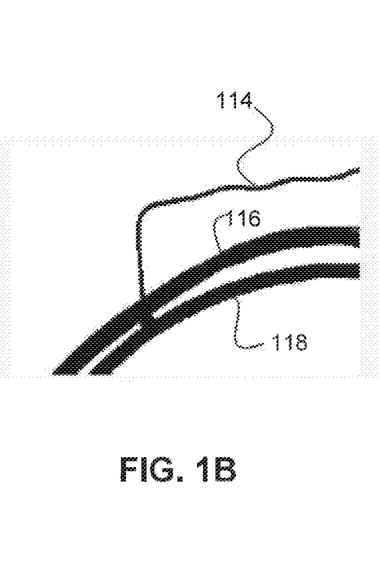
FIG. 1B shows a road feature mask.
Figure 1C:
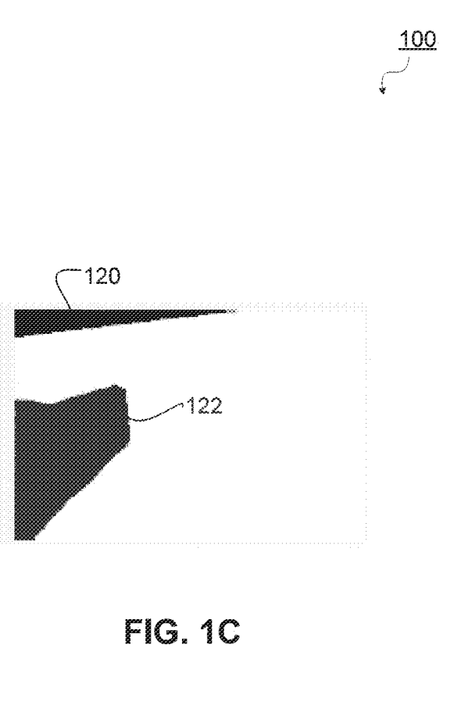
FIG. 1C shows a water feature mask.

Example embodiments combine aerial image data with vector road map data to produce road feature masks. FIGS. 1A, 1B and 1C illustrate the notion of creating a feature mask from map data. FIG. 1A is a map with water features 102 and 104, land areas 106, and road features 108, 110 and 112. FIG. 1B illustrates the notion of a road feature mask. A feature mask abstracts only the detail that is needed. For example, FIG. 1B is a feature mask for the roadway segments 114, 116 and 118. FIG. 1C on the other hand, is a water feature mask that illustrates water features 120 and 122.

The process of segmenting an aerial image according to pre-defined regions such as city blocks is facilitated by the use of road feature masks. A city block can be defined as a region enclosed by road segments. As discussed below, however, not all such enclosed regions correspond to city blocks.

Figure 2:
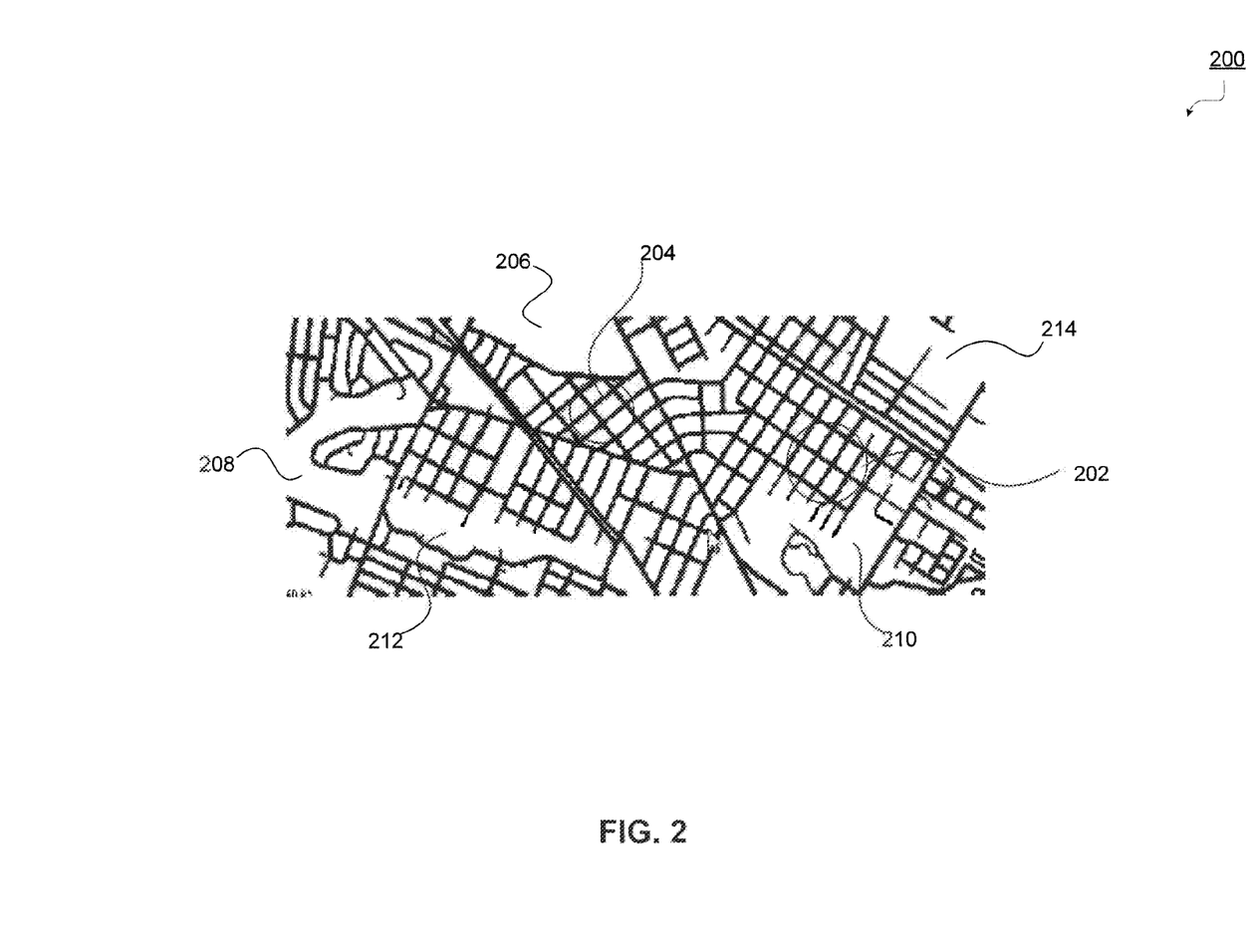
FIG. 2 is a road feature mask for a section of a city.

FIG. 2 is an example of a road feature mask for a region of a city. Various regions are illustrated. For example, 202 and 204 illustrate regions comprising city blocks. FIG. 2 also includes other areas 206, 208, 210, 212 and 214 that are not considered to be city blocks. These are large areas that are bounded by road segments, but cannot be considered to be city blocks.

The systems and methods disclosed herein deal with aerial image data and vector map data. The road feature mask of FIG. 2 was generated using vector map data for a large geographic region. The storage requirements of vector map data are much less demanding than the storage requirements for aerial image data, which is stored as raster data. Thus, for example, the vector map data needed to store the feature mask of FIG. 2 might easily be stored on one single computer or processor whereas the corresponding aerial image data for the same region, may be too large to be stored on a single computer or processor. As such, it is important to be able to break up the aerial image data in a suitable manner so that it can be processed using parallel processing techniques.

Figure 3:
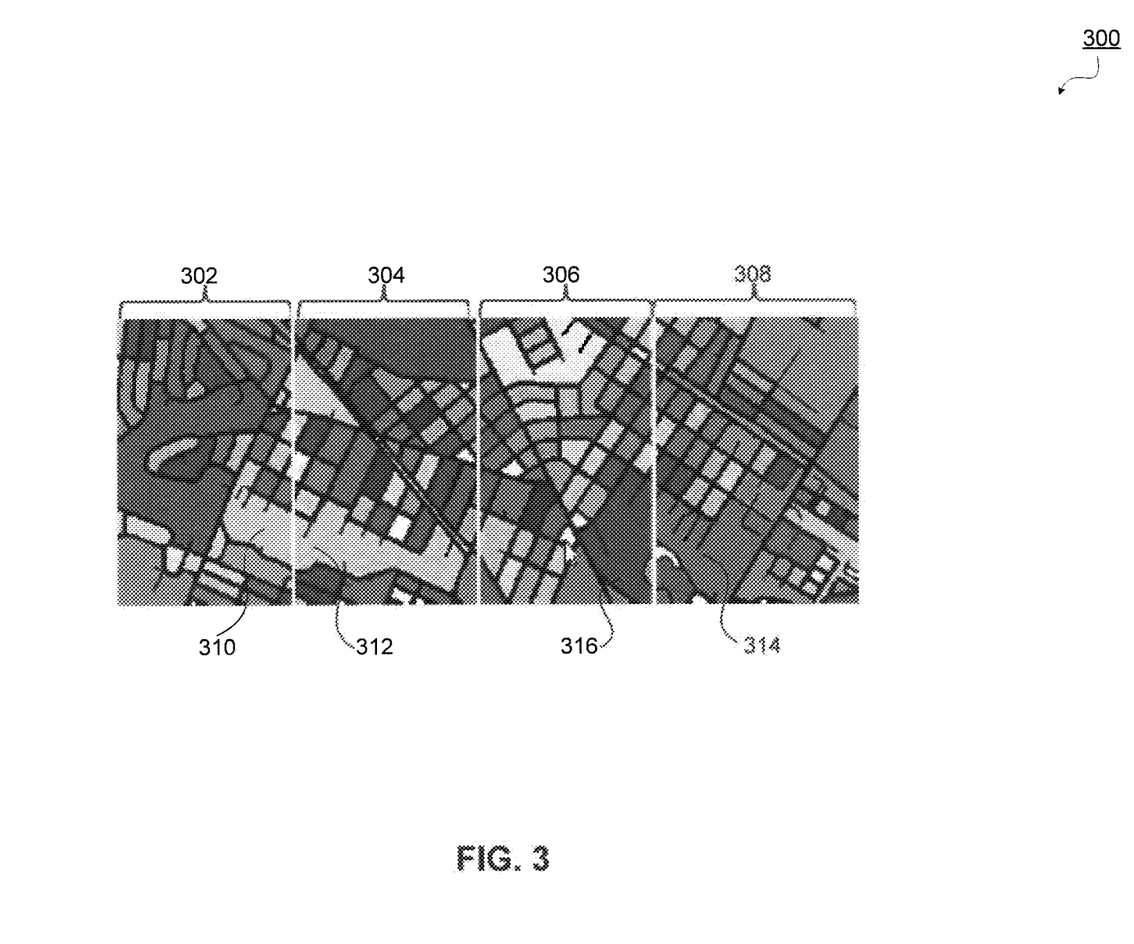
FIG. 3 shows a partitioning of the road feature mask and aerial image data into tiles, with each tile exhibiting a color map of pre-defined regions including city blocks.

FIG. 3 illustrates a way in which aerial image data can be broken up into tiles 302, 304, 306 and 308. This is an example partitioning such that the data corresponding to each tile is suitable for processing on a single processor or computer. As such the collection of tiles may be processed in parallel on a suitable parallel processing platform.

The task of a given processor is to generate a color map for each tile. In generating a color map for a given tile, the vector road data as illustrated by the road feature map in FIG. 2, is aligned with roads in the actual imagery. In generating a color map, each region (e.g., a city block) is identified with a particular color, as illustrated in FIG. 3. Note, the city-block regions 202 and 204 of FIG. 2 now appear colored in tiles 308 and 304 respectively. Each contiguous region in a given tile is a assigned a single color. The resulting regions may correspond to city blocks. In contrast, certain regions enclosed by road segments do not correspond to city blocks. Regions 310 and 312 for example, are regions that do not appear to enclose city blocks.

Note the color mapping of regions 310 and 312. Regions 310 and 312 have different colors because they were assigned independently. This is because tiles 302 and 304 were processed independently in parallel. However, regions 310 and 312 physically correspond to a single contiguous region that has been split by the tile boundary between tiles 302 and 304. Regions 314 and 316 provide another example of a region that is physically contiguous but has been split across the tile boundary. As such, regions 314 and 316 have been assigned different colors.

The next step is to generate a composite color mapping for the entire geographic region of interest by removing the tile boundaries. Systems and methods are provided that compare the color maps of adjacent tiles and reassign the colors as needed so that the pre-defined regions (e.g. city blocks) or other regions that were previously split by tile boundaries become uniformly colored contiguously across the tile boundaries. By generating such a composite color mapping, the tile boundaries are thereby removed as illustrated in FIG. 4.

Figure 4:
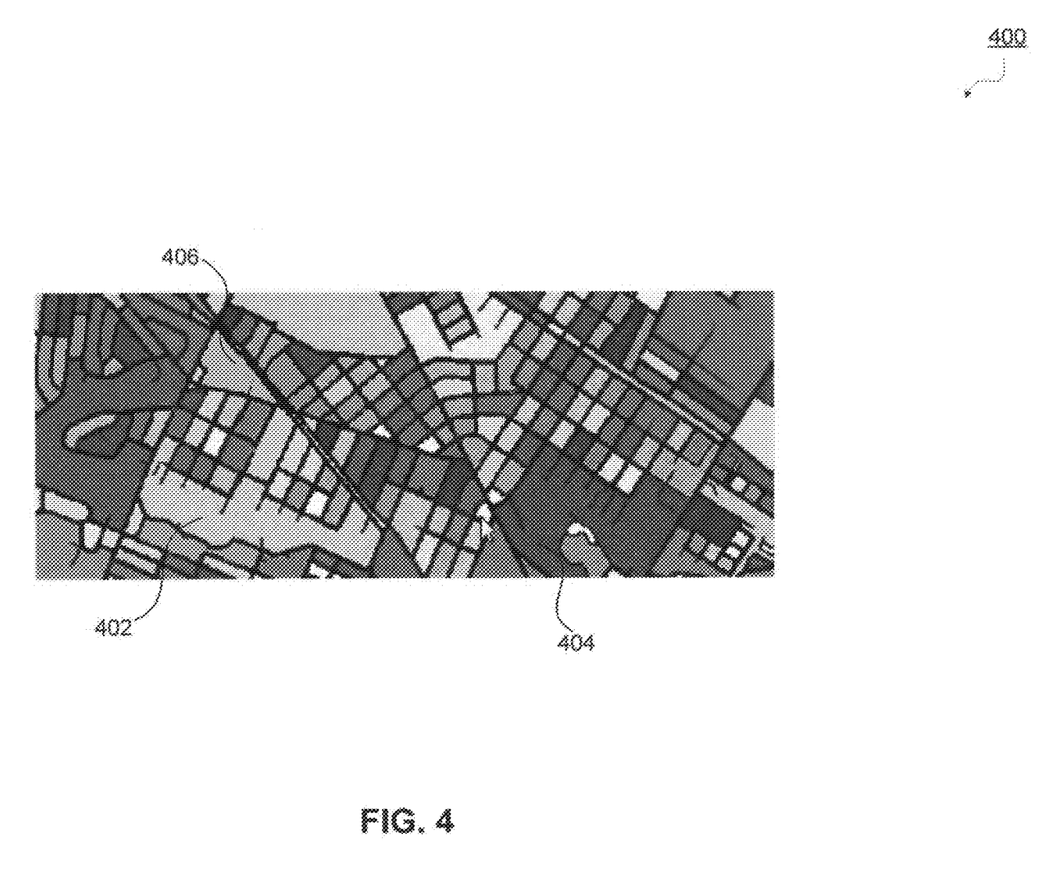
FIG. 4 shows a color map for a large geographic area after the tile boundaries of FIG. 3 have been removed.

FIG. 4 is an example illustration of a composite color mapping obtained by the process just described wherein the tile boundaries of FIG. 3 have been removed. Regions 402, 404, and 406 illustrate regions that are physically connected, but, were previously split by the tile boundaries. Note that the composite color mapping of FIG. 4 properly illustrates these regions as being contiguous and thus each one has a single solid color.

The process of generating the composite color mapping of FIG. 4 should be contrasted with the process of generating the individual color mappings of FIG. 3. The process of generating the individual color mappings of FIG. 3, requires the alignment of aerial image data with vector map data. As such, the process has to be done in pieces due to the large volume of data associated with aerial imagery. For example, tiles 302, 304, 306 and 308 could be processed among different processors or computers. The process of generating the composite color map of FIG. 4 from the individual color maps however, is a different process in that now one is only comparing the resultant color maps. As such, there is no longer a need to use the aerial image data. Thus, the process of generating the composite color map of FIG. 4 from FIG. 3 is much less computationally demanding, and potentially can be carried out on a single processor or single computer.

One of the uses of the systems and methods disclosed herein is for building computer models of surface features of the earth based on aerial imagery. Examples of surface features of interest include buildings, bridges, etc. As such it is advantageous to remove from the color map, regions that do not correspond to city blocks. By removing featureless regions, such as bodies of water, fields, etc., the computational efficiency associated with model building is increased by eliminating the need to consider areas that are unlikely to contain features of interest. Regions 502, 504, 506 and 508 in FIG. 5 do not correspond to city blocks and are examples of regions that can be removed.

After removing regions from the composite color map that are either too large or too small to be city blocks or other such pre-defined regions, the last step in segmenting aerial imagery is to compute and store bounding boxes for the remaining pre-defined regions.

Figure 6:
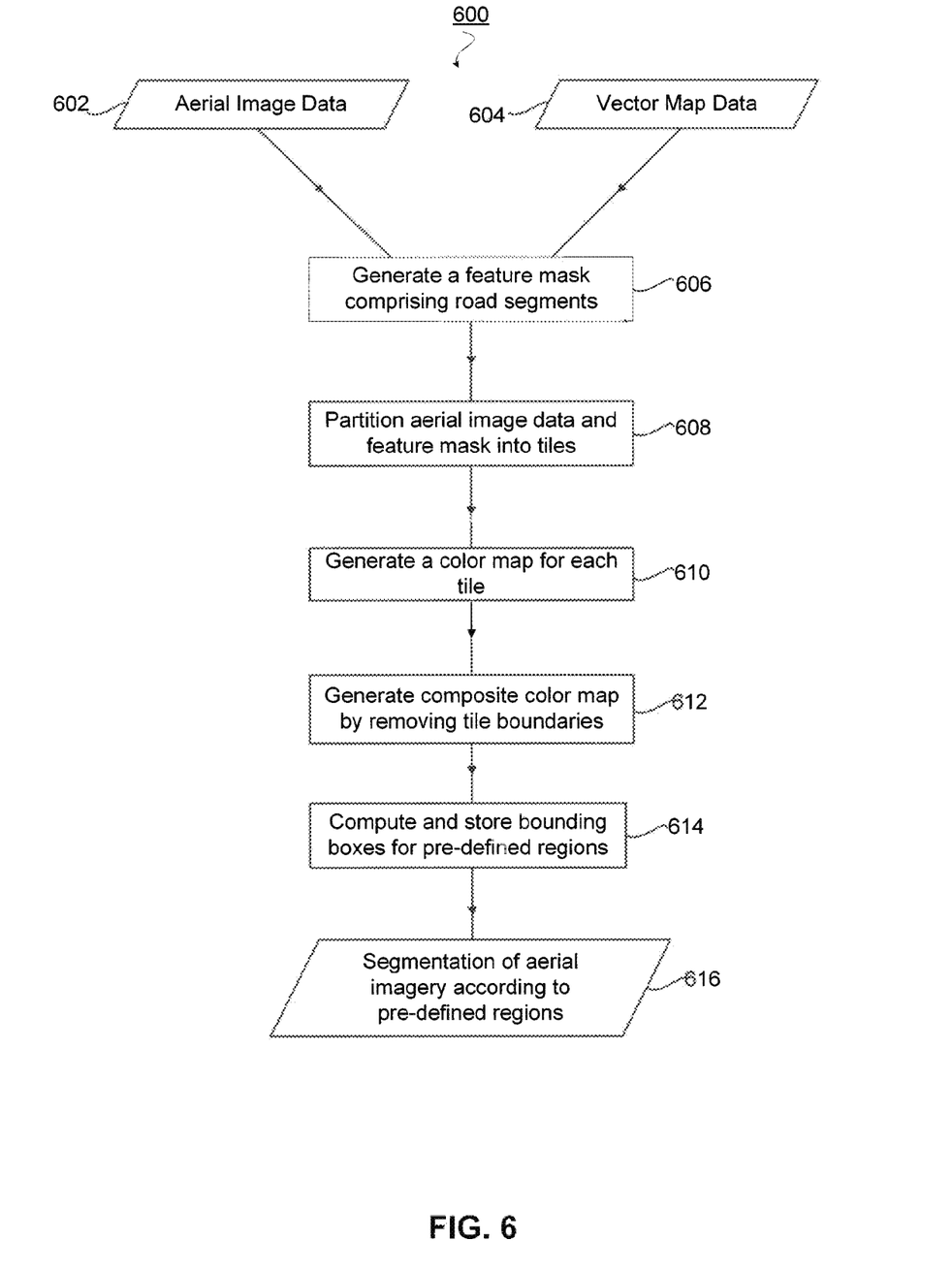
FIG. 6 is a flowchart illustrating a method of segmenting aerial imagery according to pre-defined regions.

FIG. 6 illustrates a method of segmenting aerial imagery according to pre-defined regions as discussed above. This method combines aerial image data 602 with vector map data 604 to generate a feature mask comprising road segments 606 as illustrated in FIG. 2. In the next step 608, the aerial image data and feature mask data are partitioned into tiles as previously discussed with reference to FIG. 3. In the next step 610, a color map is generated for each tile as illustrated in FIG. 3.

In the next step 612, a composite color map is generated as illustrated in FIG. 4 by removing tile boundaries. As discussed previously, this is done by comparing color maps of adjacent tiles, and reassigning colors as needed so that pre-defined regions split by tile boundaries, become uniformly colored contiguously across tile boundaries. In this way tile boundaries are removed.

Figure 5:
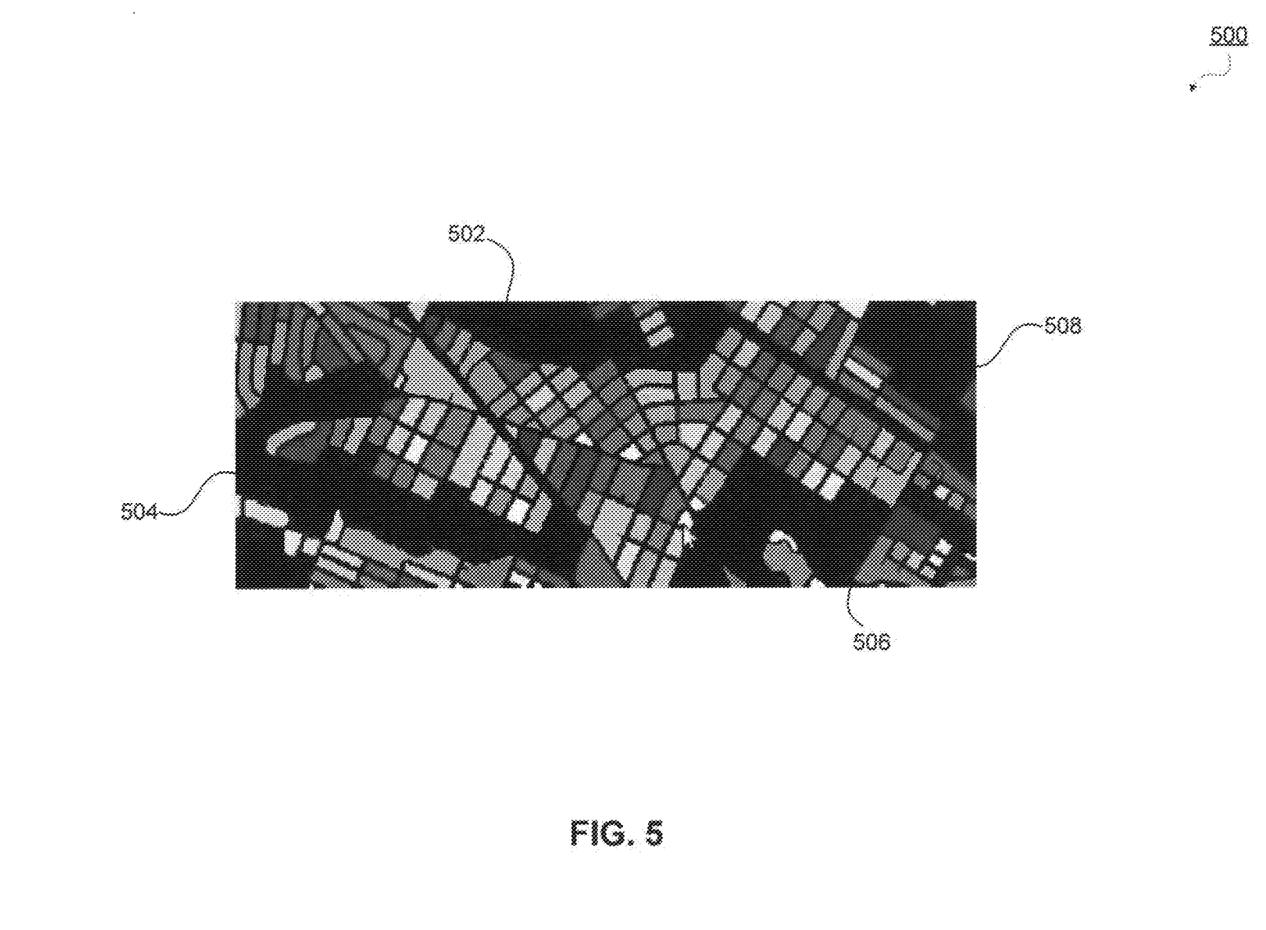
FIG. 5 shows a color map for an entire geographic region after non-city block regions have been removed.

In the next step 614, bounding boxes for pre-defined regions in the composite color map are computed and stored after regions that are either too large or too small to be pre-defined regions are removed. The result 616 is the segmentation of the aerial imagery according to pre-defined regions as illustrated in FIG. 5.

Figure 7:
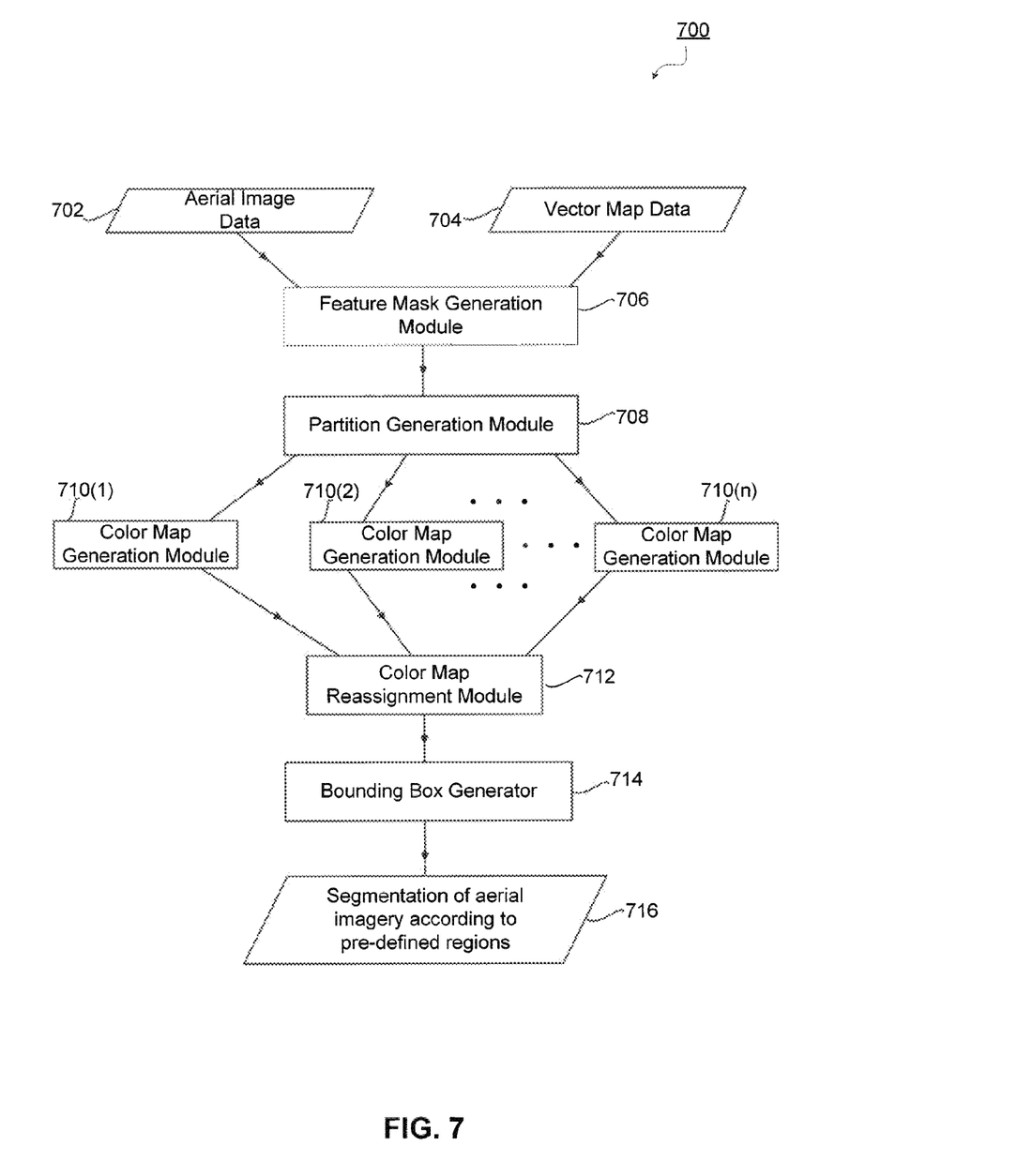
FIG. 7 illustrates a system for segmenting aerial imagery according to pre-defined regions.

FIG. 7 illustrates a system for segmenting aerial imagery according to pre-defined regions. This example system comprises a feature mask generation module 706 that is configured to use vector map data 704, and aerial image data 702, to generate a feature mask comprising road segments for a geographic region of interest. The feature mask resulting from the feature mask generation module 706 is fed to a partition generation module 708 that is configured to partition the aerial image data and corresponding feature masks into tiles such that the data within a tile is suitably partitioned for parallel processing.

The data that has been partitioned by the partition generation module 708, is fed to one or more color map generation modules 710(1), 710(2) . . . 710(n). Each color map generation module is configured to generate a color map for each tile. Within each tile, the color map comprises a plurality of pre-defined regions in which each pre-defined region, defined by enclosing road segments, is assigned a single uniform color. It is generated by aligning vector map data with road features contained in aerial imagery.

The collection of color maps for each of the tiles is then fed to the color map reassignment module 712. This module is configured to generate a composite color mapping for the entire geographic region of interest by comparing the color maps of adjacent tiles and reassigning colors as needed so that the pre-defined regions, split by tile boundaries, become uniformly colored contiguously across tile boundaries. In this way tile boundaries are removed.

The composite color map generated by the color map reassignment module 712 is then fed to the bounding box generator 714, which is configured to generate a segmentation of the aerial imagery for the entire geographic region of interest. This is done by computing and storing bounding boxes for pre-defined regions in the composite color map after removing regions that are either too large or too small to be pre-defined regions. The result, 716 is the segmentation of aerial imagery according to pre-defined regions.

CONCLUSION

The summary and abstract sections may set forth one or more, but not all exemplary embodiments of the present invention as contemplated by the inventors and are thus not intended to limit the present invention, and appended claims in any way.

Various embodiments have been described above with the aid of functional building blocks illustrating the implementation of specific features and relationships thereof. The boundaries of these functional building blocks have been arbitrarily defined herein for the convenience of the description. Alternate boundaries can be defined so long as specific functions and relationships thereof are appropriately performed. The foregoing description of these specific embodiments will so fully reveal the general nature of the invention, that others can apply knowledge of those skilled in the art to readily modify and/or adapt for various applications, such as specific embodiments without undue experimentation, without departing from the general concept of the present invention. Therefore, such adaptations and modifications are intended to be within the meaning and range of equivalents of the disclosed embodiments, based on the teachings and guidance presented herein. It is to be understood that the phraseology or terminology herein is for the purpose of description and not limitation, such that the terminology and phraseology of the present specification is to be interpreted by those skilled in the art in light of the teachings and guidance disclosed herein.

The breadth and scope of the present invention should not be limited by any of the above-described exemplary embodiments.

What is claimed is:

1. A computer implemented method of segmenting aerial imagery according to predefined regions, comprising:
    (a) generating a feature mask comprising road segments, using vector map data, for aerial image data corresponding to a geographic region of interest;
    (b) partitioning the aerial image data and corresponding feature mask into tiles, such that the data within a tile is suitably partitioned for parallel processing;
    (c) generating a color map for each tile, wherein the color map comprises a plurality of predefined regions in which each predefined region, defined by enclosing road segments, is assigned a single uniform color;
    (d) generating a composite color mapping for the entire geographic region of interest by comparing the color maps of adjacent tiles and reassigning colors as needed so that predefined regions, split by tile boundaries, become uniformly colored contiguously across tile boundaries thereby removing tile boundaries; and
    (e) generating a segmentation of the aerial imagery for the entire geographic region of interest by computing and storing bounding boxes for predefined regions in the composite color map after removing regions that are either too large or too small to be predefined regions.

2. A method according is claim 1, wherein each predefined region comprises a city block.

3. A computer implemented system for segmenting aerial imagery, according to predefined regions, comprising:
    (a) a feature mask generation module configured to use vector map data to generate a feature mask comprising road segments, for aerial image data corresponding to a geographic region of interest;
    (b) a partition generation module configured to partition the aerial image data and corresponding feature mask into tiles, such that the data within a tile is suitably partitioned for parallel processing;
    (c) one or more color map generation modules configured to generate a color map for each tile, wherein the color map comprises a plurality of predefined regions in which each predefined region, defined by enclosing road segments, is assigned a single uniform color;
    (d) a color map reassignment module configured to generate a composite color mapping for the entire geographic region of interest, by comparing the color maps of adjacent tiles and reassigning colors as needed so that predefined regions, split by the boundaries, become uniformly colored contiguously across tile boundaries, thereby removing the boundaries; and
    (e) a bounding box generator configured to generate a segmentation of the aerial imagery for the entire geographic region of interest, by computing and storing bounding boxes for predefined regions in the composite color map after removing regions that are either too large or too small to be predefined regions.

4. A system according to claim 3, wherein each predefined region Comprises a city block.

5. A non-transitory computer readable storage medium having instructions stored thereon that, when executed by a processor, cause the processor to perform operations including:
- (a) generating a feature mask comprising road segments, using vector map data, for aerial image data corresponding to a geographic region of interest;
- (b) partitioning the aerial image data and corresponding feature mask into tiles, such that the data within a tile is suitably partitioned for parallel processing;
- (c) generating a color map for each tile, wherein the color map comprises a plurality of predefined regions in which each predefined region, defined by enclosing road segments, is assigned a single uniform color;
- (d) generating a composite color mapping for the entire geographic region of interest by comparing the color maps of adjacent tiles and reassigning colors as needed so that predefined regions, split by tile boundaries, become uniformly colored contiguously across tile boundaries, thereby removing tile boundaries; and
- (e) generating a segmentation of the aerial imagery for the entire geographic region of interest by computing and storing bounding boxes for predefined regions in the composite color map after removing regions that are either too large or too small to be predefined regions.

6. A non-transitory computer readable storage medium according to claim 5, wherein each predefined region comprises a city block.

\* \* \* \* \*

UNITED STATES PATENT AND TRADEMARK OFFICE
CERTIFICATE OF CORRECTION

PATENT NO. : 8,520,940 B1  
APPLICATION NO. : 13/103585  
DATED : August 27, 2013  
INVENTOR(S) : Schpok et al.

Page 1 of 1

It is certified that error appears in the above-identified patent and that said Letters Patent is hereby corrected as shown below:

In the Claims

Column 6
Line 38, please replace "according is" with --according to--.

Column 6
Line 59, please replace "split by the boundaries" with --split by tile boundaries--.

Column 7
Line 2, please replace "Comprises" with --comprises--.

Signed and Sealed this
Twenty-fourth Day of December, 2013

Margaret A. Focarino
*Commissioner for Patents of the United States Patent and Trademark Office*